United States Patent
Jadhav et al.

(10) Patent No.: US 10,783,348 B2
(45) Date of Patent: Sep. 22, 2020

(54) METHOD AND SYSTEM FOR DETECTION AND CLASSIFICATION OF PARTICLES BASED ON PROCESSING OF MICROPHOTOGRAPHIC IMAGES

(71) Applicant: IMAGEPROVISION TECHNOLOGY PVT. LTD., Pune (IN)

(72) Inventors: Prithviraj Jadhav, Pune (IN); Sandeep Kulkarni, Pune (IN); Saket Kumar, Pune (IN); Ankita Saxena, Pune (IN); Pooja Kalshetti, Pune (IN)

(73) Assignee: ImageProVision Technology Pvt. Ltd., Pune (IN)

( * ) Notice: Subject to any disclaimer, the term of this patent is extended or adjusted under 35 U.S.C. 154(b) by 0 days.

(21) Appl. No.: 15/761,876

(22) PCT Filed: Sep. 21, 2016

(86) PCT No.: PCT/IB2016/055629
§ 371 (c)(1),
(2) Date: Mar. 21, 2018

(87) PCT Pub. No.: WO2017/051327
PCT Pub. Date: Mar. 30, 2017

(65) Prior Publication Data
US 2018/0260610 A1     Sep. 13, 2018

(30) Foreign Application Priority Data
Sep. 22, 2015 (IN) .......................... 3591/MUM/2015

(51) Int. Cl.
*A61B 5/05* (2006.01)
*G06K 9/00* (2006.01)
(Continued)

(52) U.S. Cl.
CPC ......... *G06K 9/00147* (2013.01); *G01N 21/01* (2013.01); *G06K 9/0014* (2013.01); *G06K 9/033* (2013.01); *G06K 9/036* (2013.01); *G06K 9/40* (2013.01); *G06K 9/4638* (2013.01); *G06K 9/4652* (2013.01); *G06K 9/622* (2013.01);
(Continued)

(58) Field of Classification Search
USPC ....... 382/100, 103, 108, 128, 133–134, 162, 382/172, 181, 190, 194, 199, 209, 214, 382/224, 232, 254, 274–276, 286–291, 382/305, 312, 321; 435/4, 7.21; 600/408
See application file for complete search history.

(56) References Cited

U.S. PATENT DOCUMENTS 8,249,326 B2 * 8/2012 Macaulay .......... G01N 33/5091
                                                  382/133
2005/0266395 A1 * 12/2005 Gholap .................... G06K 9/48
                                                  435/4
(Continued)

*Primary Examiner* — Seyed H Azarian
(74) *Attorney, Agent, or Firm* — FisherBroyles, LLP; Ariel Reinitz

(57) ABSTRACT

Disclosed herein is a methodology, including the method and system to enable the same, for detection and classification of microscopic particles by an image analysis approach employing grayscale pixel intensity contour data generated from microphotographs, identifying discrete particles therein by applying user-defined filters, and outputting a statistically-processed report of the outcome thereof.

15 Claims, 12 Drawing Sheets

(51) Int. Cl.
*G06T 7/00* (2017.01)
*G01N 21/01* (2006.01)
*G06T 7/187* (2017.01)
*G06T 7/11* (2017.01)
*G06T 7/60* (2017.01)
*G06K 9/03* (2006.01)
*G06K 9/40* (2006.01)
*G06K 9/46* (2006.01)
*G06K 9/62* (2006.01)
*H04N 5/232* (2006.01)

(52) U.S. Cl.
CPC .............. *G06T 7/00* (2013.01); *G06T 7/0004* (2013.01); *G06T 7/11* (2017.01); *G06T 7/187* (2017.01); *G06T 7/60* (2013.01); *H04N 5/23293* (2013.01); *G06T 2207/10056* (2013.01)

(56) References Cited

U.S. PATENT DOCUMENTS

| | | | | |
|---|---|---|---|---|
| 2008/0182276 A1* | 7/2008 | Bacus | .............. | G01N 33/57484 |
| | | | | 435/7.21 |
| 2012/0093387 A1* | 4/2012 | Gholap | .............. | G06K 9/00127 |
| | | | | 382/133 |
| 2012/0184840 A1* | 7/2012 | Najarian | ................... | G06T 7/68 |
| | | | | 600/408 |

* cited by examiner (a)

(b)

(c)

(a)

(b)

(a)

(b)

Your Company Name
PClass Calibration Report

Instrument ID -   
Report ID - 190916201723

Date/Time - 19-Sep-16, 20:18:06

| Field | Detail |
|---|---|
| Make | |
| Model No | |
| Serial No | |
| ID No | |
| Calibration Done On | 16/9/16 |
| Next Calibration Due On | 16/7/17 |
| Last Calibration Done On | |

| Objective | Calibration value (pixels/µ) |
|---|---|
| 4 x | 2.17500 |
| 10 x | 0.89626 |
| 40 x | 0.22501 |
| 100 x | 0.08739 |

DONE BY:  
DATE:

CHECKED BY :  
DATE :

Figure 11

Your Company Name

PClass Validation Report

Instrument ID -                                                                                            Date Time - 19-Sep-16, 10:08:07
Report ID - 220916100807

| Field | Detail |
|---|---|
| Make | |
| Model No | |
| Serial No | |
| ID No | |
| Calibration Done On | 16/9/16 |
| Next Calibration Due On | 16/7/17 |
| Last Calibration Done On | |

| Objective | Calibrated value (µ) | Desired value (µ) | Acceptable Criteria | Acceptable (Y/N) |
|---|---|---|---|---|
| 4 x | 152.69615 | 150.00 | 145.50-154.50 | Y |
| 10 x | 71.79390 | 70.00 | 67.90-72.10 | Y |
| 40 x | 70.18677 | 70.00 | 67.90-72.10 | Y |
| 100 x | 70.89619 | 70.00 | 67.90-72.10 | Y |

4 x
10 x
40 x 100 x

DONE BY:                                                             CHECKED BY :
DATE:                                                                DATE :

METHOD AND SYSTEM FOR DETECTION AND CLASSIFICATION OF PARTICLES BASED ON PROCESSING OF MICROPHOTOGRAPHIC IMAGES

FIELD OF THE INVENTION

The present invention belongs to the field of image processing and, in that, relates particularly to an applied method and system for identification and classification of particulate matter based on processing of their microphotographic images.

BACKGROUND OF THE INVENTION

Image processing generally refers to digitization of optical images, and performing operation(s) on the so-converted data to augment and/or extract further meaningful information, preferably in an automated manner. Signal dispensation of source data, approach for processing said input source data and interpretation of post-processing output are major areas of interdisciplinary research in field of the present invention wherein image visualization, restoration, retrieval, measurement and recognition are prime loci of progressive investigation.

Particle Analysis and Particle Characterization are major areas of research in new drug or formulation development in pharmaceutical industry. A proper analysis of particle size and shape reduces development time to a great extent. However, most of the current microscopic analysis is done manually which requires more time besides being prone to subjective interpretation and requires an expert to take the decision.

Processing of microphotographic images, in above parlance, is found to be employed variably in state-of-art technologies for study of microscopic particles wherein identifying indicia among their physical, chemical, compositional, morphological attributes and/or physiological behaviors are utilized for qualitative and/or quantitative determinations including identification and size distribution of the particles under study. However, such implements are presently limited to non-visual light microscopy applications such as X-ray microtomography (µCT), transmission electron microscopy (TEM), scanning electron microscopy (SEM) and the like. Therefore, it would be advantageous to have some means for availing advantages of image processing technology for visual light/optical microscopy, particularly particle analysis applications.

Conventionally, detection and classification of particles has been practiced via sieving, sedimentation, dynamic light scattering, electrozone sensing, optical particle counting, XRD line profile analysis, adsorption techniques and mercury intrusion or further indirect methods such as surface area measurements. However, resolution of these techniques leave a lot to be desired, besides relying on availability of expensive equipment and collateral prior expertise of skilled operators for arriving at the determination intended. Such analysis, as will be obvious to the reader, tends to be less reproducible due to unavoidable personal biases and therefore inaccurate for faultless determinations. There is hence a need for some way that makes possible the integration of image analytics for particle classification in optical microscopy applications.

The art therefore requires a particle identification and classification technology that is capable of plug-and-play integration in existing optical microscopy application environments with minimal bias on capital, integration and operative expenses and at the same time, being of a nature that allows accurate and precise implementation by any person even ordinarily skilled in the art. Ability to succinctly discern despite strong variability among objects of interest, low contrast, and/or high incidence of agglomerates and background noise are additional characters desirable in said particle identification and classification technology presently lacking in state-of-art.

Prior art, to the limited extent presently surveyed, does not list a single effective solution embracing all considerations mentioned hereinabove, thus preserving an acute necessity-to-invent for the present inventors who, as result of his focused research, have come up with novel solutions for resolving all needs of the art once and for all. Work of the presently named inventors, specifically directed against the technical problems recited hereinabove and currently part of the public domain including earlier filed patent applications, is neither expressly nor impliedly admitted as restrictive prior art against the present disclosures.

A better understanding of the objects, advantages, features, properties and relationships of the present invention will be obtained from the following detailed description which sets forth an illustrative yet-preferred embodiment.

Objectives of the Present Invention

The present invention is identified in addressing at least all major deficiencies of art discussed in the foregoing section by effectively addressing the objectives stated under, of which:

It is a primary objective of the present invention to introduce automation, and therefore greater accuracy and precision inherent to machine processes, for identification, analysis and classification of microscopic particles.

It is another objective further to the aforesaid objective(s) that the method and system introduced therefor remove the subjectivity of sample preparation and manual errors and also alleviate the dependency on specialized techniques, specific nature of samples, and/or costly equipment.

It is another objective further to the aforesaid objective(s) that the method and system so introduced have high accuracy and precision while having the capability of fast processing to provide quick results.

It is another objective further to the aforesaid objective(s) that the method and system so introduced are capable of discerning between true measurable attributes and noise/aberrations in the microphotographic images being processed.

It is another objective further to the aforesaid objective(s) that the method and system so introduced are not restricted from any morphology expected in particles being analysed.

It is another objective further to the aforesaid objective(s) that the method and system so introduced are capable of working with either of solid, semi-solid or liquid samples.

These and other objectives and their attainment will become apparent to the reader upon the detailed disclosures to follow.

BRIEF DESCRIPTION OF DRAWINGS

The present invention is explained herein under with reference to the following drawings, in which:

FIG. 11 is a sample calibration report in the present invention substantially according to the disclosures hereof.

Figure 1:
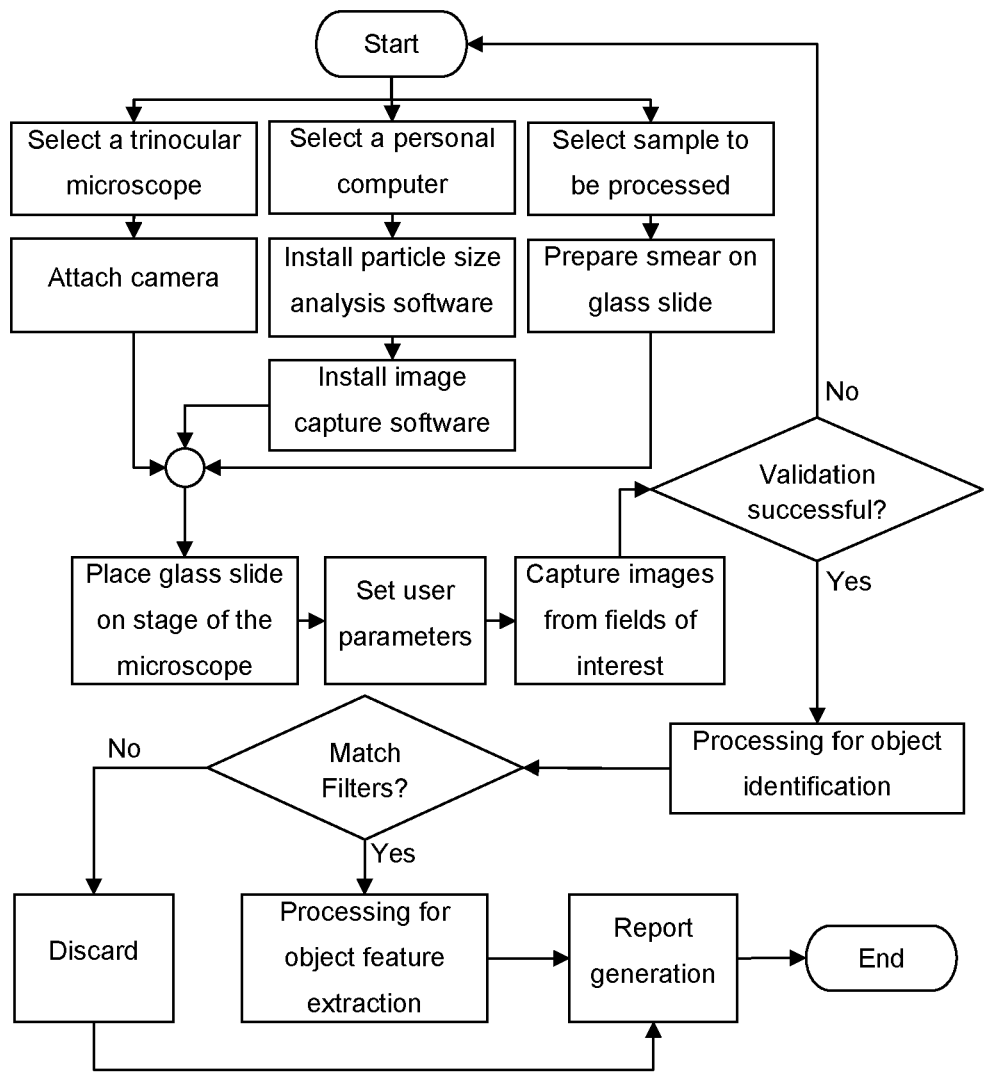
FIG. 1 is a flowchart explaining a prescribed protocol of implementing the present invention substantially according to the disclosures hereof.

In above drawings, wherever possible, the same references and symbols have been used throughout to refer to the same or similar parts. References made to particular examples and implementations are for illustrative purposes, and are not intended to limit the scope of the invention or the claims. Though numbering has been introduced to demarcate reference to specific components in relation to such references being made in different sections of this specification, all components are not shown or numbered in each drawing to avoid obscuring the invention proposed.

Summary/Statement of the Present Invention

The disclosures herein introduce a microscopy based methodology for identification and classification of objects from microphotographs by capturing their Z-Stack images through an optical microscope connected to a digital camera and associated personal computer, therein identifying microscopic objects based on their grayscale intensity contour maps, and classifying them into desired attributes including Width, Circularity, Convex hull, Solidity, Convexity, Circular Equivalent Diameter (CED), Aspect Ratio, Major Axis, Color, and Texture as per user-defined filters.

Attention of the reader is now requested to the detailed description to follow which narrates a preferred embodiment of the present invention and such other ways in which principles of the invention may be employed without parting from the essence of the invention claimed herein.

Definitions and Interpretations

Before undertaking the detailed description of the invention below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect, with, contain, be contained within, connect to or with, couple to or with, be communicable with, cooperate with, interleave, juxtapose, be proximate to, be bound to or with, have, have a property of, or the like. The term "PC" shall refer and mean a personal computer; the term "object" shall refer and mean a particle, or active pharmacological ingredient or any object of interest to be assessed in the microphotographic image; the term "API" shall mean and refer active pharmacological ingredients.

DETAILED DESCRIPTION

Principally, general purpose of the present invention is to assess disabilities and shortcomings inherent to known systems comprising state-of-art and develop new systems incorporating all available advantages of known art and none of its disadvantages. Accordingly, the disclosures herein are specifically directed to an applied method and system for identification and classification of particulate matter based on processing of their microphotographic images.

Reference is now had to few ways of practicing the present invention which are to be considered as exemplary, rather than restrictive, of its scope intended.

The application environment of the present invention is centred around an optical microscope to which a digital camera is fitted. Images of the microscopic field captured via said camera are routed for processing using software embodying the logic for processing in accordance with the present invention. A user-interface and reporting format are provided for allowing human operators to use the system so provided. Further embodiments of the present invention are intended wherein the processing logic is capable of handling indicia chosen among size, edge/boundary shape, texture, fluorescence, their equivalents and their combinations for identification and size distribution of the particles of interest under study.

To generally relate, the present invention comprises both hardware and software components, which form a cohesive complementary pair. The hardware component refers to a trinocular microscope and a digital camera whereas software component refers to a computer-executable routine each for capturing images via the digital camera and processing thereof for particle size analysis.

The general scheme of implementing the present invention, as may be referred from the accompanying FIG. 1, commences with selection of a sample to be processed; An optical microscope, preferably one with trinocular eyepiece assembly having camera attachment; A digital camera to be received on the said microscope; and A personal computer to which the digital camera may be connected via USB wired connection or other means such as WiFi and the equivalent as may be supported by the hardware selected. A computer executable routine in form of a proprietary computer-implementable tool/component developed by the present inventors (which is compliant with 21 CFR rules of multiple level of authorization, Data security, audit trails, password protection) is installed on the said personal computer, thereby enabling it to identify, classify particles in the sample based on processing of microphotographic images captured by the digital camera fitted to the microscope. Said proprietary computer-implementable tool/component provides for execution of distinct subroutines/algorithms for identification of particles present in the sample and extraction of object feature data therein as shall be evident to the reader upon the disclosures to follow.

With continued reference to the accompanying FIG. 1, it can be seen that once hardware and sample are arranged as per the preceding disclosures, a sample (wet or dry—solid, semi-solid or liquid sample) smear is required to be manually prepared next by the user on a glass slide using conventional laboratory techniques. The resultant slide with sample smear is then placed under the microscope pre-fitted with the digital camera. The computer-executable routine/bundled imaging software that comes with the digital camera for capturing images via the digital camera is pre-installed on the personal computer which, when executed, is capable and arranged to show a live video of the sample under processing on monitor of the connected personal computer. The present inventors also propose a dedicated image capture tool/applet which captures multiple frames automatically even as the user keeps changing the focussing of the microscope. The user them may then set appropriate brightness, contrast and intensity of the microscope illumination/light, thereafter focus and select different fields in the visual imagery so obtained, and capture selected fields of view/areas of interest using the digital camera attached to the microscope. Selected images are then transferred to the computer-executable routine/aforementioned proprietary computer-implementable tool on the personal computer receiving the life image feed from the microscope, for particle size analysis.

Figure 2:
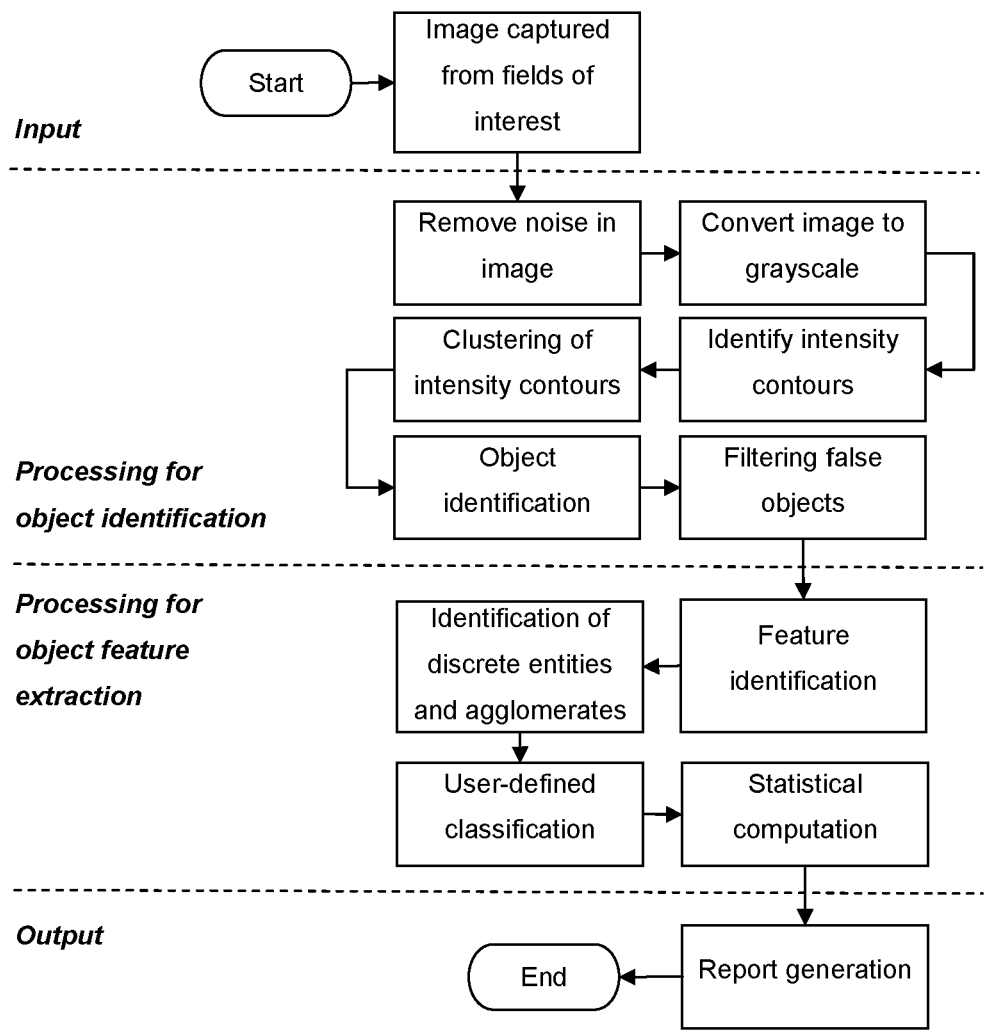
FIG. 2 is a flowchart explaining the processing logic of the proprietary computer-implementable tool/component of the present invention substantially according to the disclosures hereof.

Processing of a selected image of interest being received by the proprietary computer-implementable tool on the personal computer, as may particularly be referred in the accompanying FIG. 1 and further in the section titled "Processing for object identification" in FIG. 2, commences with conditioning of the image by application of a Gaussian smooth algorithm for removal of noise and artifacts as may be present in the said image. As next conditioning step, the image is converted to grayscale by removing all color data. This also results in reduction of file size and thus, allows storage/processing in computers with conservative or limited hardware specifications.

Figure 3:
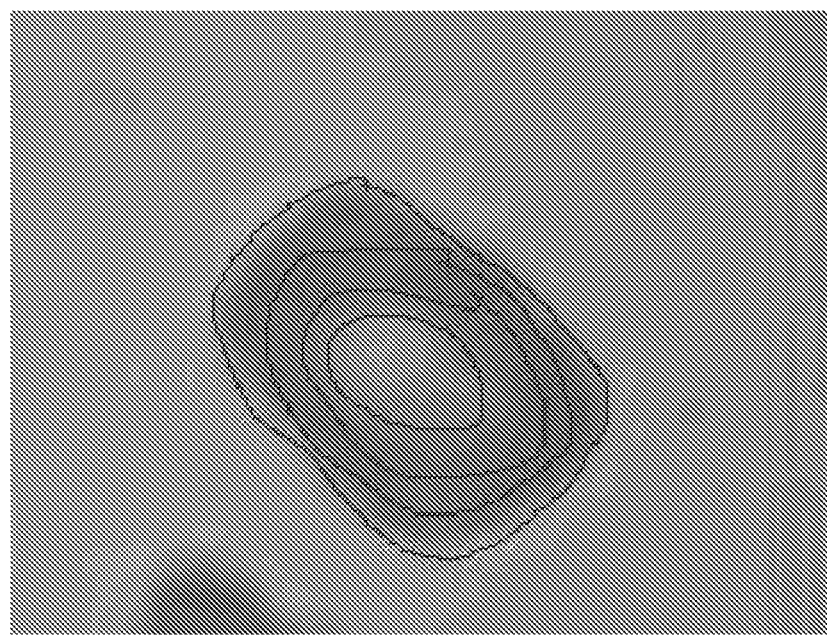
FIG. 3 is a microphotographic image of a sample, in which colour intensity contours are plotted for identification of objects in the present invention substantially according to the disclosures hereof.

In a subsequent step in execution of the proprietary computer-implementable tool introduced hereinbefore being referred in the accompanying FIG. 1, which is further identified in the section titled "Processing for object identification" in FIG. 2, and particularly illustrated in FIG. 3, gray level intensities of pixels comprising the conditioned image are measured on a scale of 0 to 255 points with unit increments of 10 points. Thereafter, the pixels corresponding to the same gray level intensity are connected to thereby result in a contour map analogous to a geographical contour map attained by joining topographies of similar height. It shall be understood, that the contours here stand to identify black or white objects in the image under processing. FIG. 3 particularly shows the contour map obtained for a particle in the image under processing.

Figure 4:
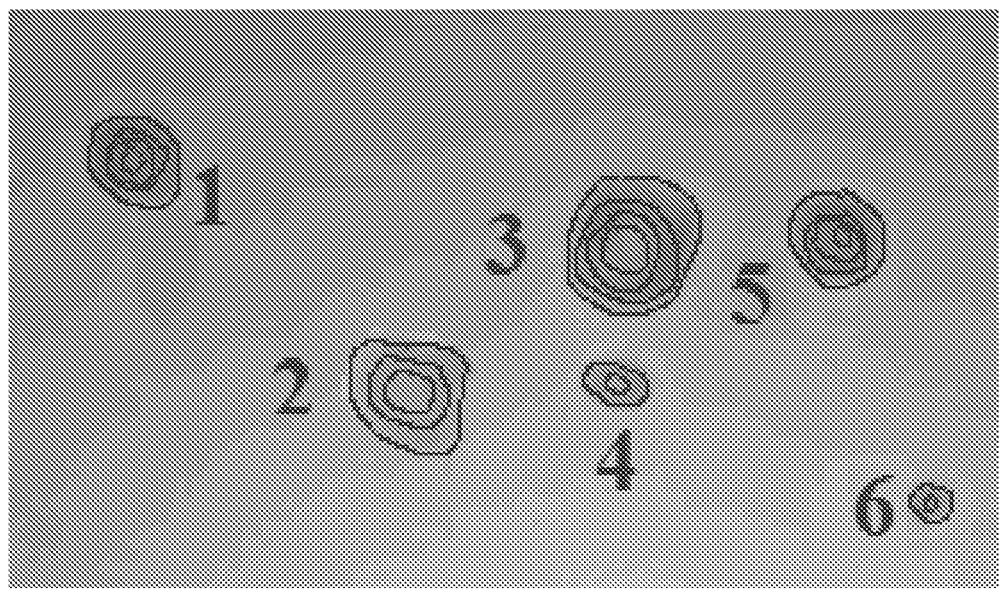
FIG. 4 is a microphotographic image of a sample, in which contour groups are clustered for identification of objects in the present invention substantially according to the disclosures hereof.

In a subsequent step in execution of the proprietary computer-implementable tool introduced hereinbefore being referred in the accompanying FIG. 1, which is further identified in the section titled "Processing for object identification" in FIG. 2, and particularly illustrated in FIG. 4, contour groups are formed on the closeness criteria among all contours identified as per the preceding disclosures and the shared area between them. FIG. 4 particularly shows six contour groups obtained for a sample image under processing.

Figure 5:
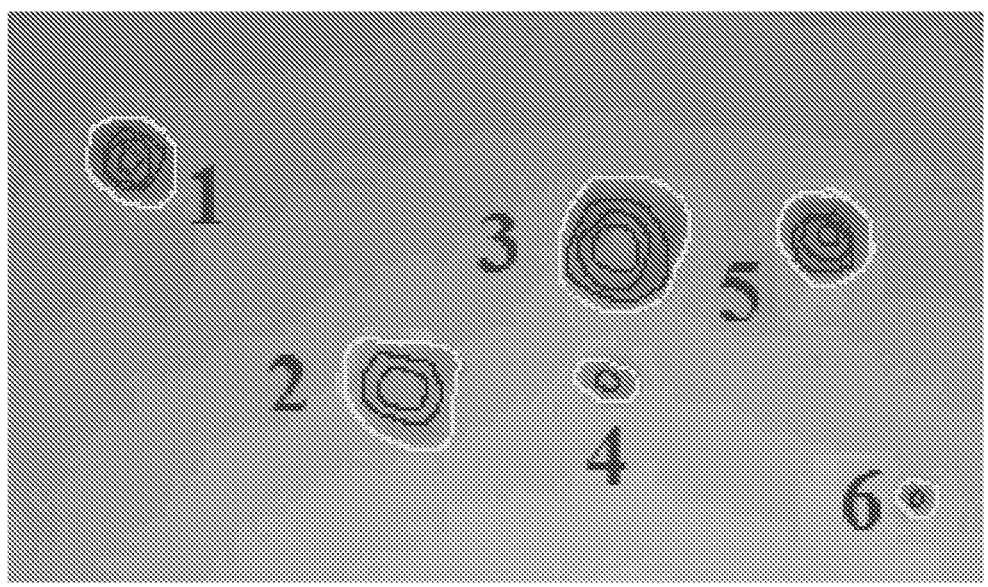
FIG. 5 is the microphotographic image of FIG. 4, in which objects are identified from clustered contour groups in the present invention substantially according to the disclosures hereof.

In a subsequent step in execution of the proprietary computer-implementable tool introduced hereinbefore being referred in the accompanying FIG. 1, which is further identified in the section titled "Processing for object identification" in FIG. 2, and particularly illustrated in FIG. 5, object boundaries are identified among the contours groups identified as per the preceding disclosures. For this purpose, the proprietary computer-implementable tool provisions for selection among different approaches among edge sharpness, bounding rectangle, and circularity to thereby identify the best contour which is recorded as the object boundary of the object being identified. Contours with highest sharpness are selected as object boundaries if edge sharpness approach is opted for edge detection. Outermost contours are selected as object boundaries if bounding rectangle approach is opted for edge detection. The circularity approach is opted for objects which are typically/expected to be circular in nature, wherein contour with highest circularity is identified as best representative of the object boundary.

In a subsequent step in execution of the proprietary computer-implementable tool introduced hereinbefore being referred in the accompanying FIG. 1, false detection of objects is circumvented by provisioning user-defined filters, which are feature-based attributes of interest in particular, that serve to validate data intended for further processing. Accordingly, the preferred embodiment of the present invention lists sharpness and size as filters which may be defined by the user as a working range, out of which any reading, which may be attributable to aberrations, artifacts and/or different optical layers in the microscopic view which constitutes the blurred part of the image, is discarded being unfit for processing. Further accordingly, the user may, through user interface of the proprietary computer-implementable tool, define a size range of the particles (in units such as micro/nano meters) as per sample chosen. Similarly, objects with edge sharpness lower than the user-defined sharpness are filtered out of the data available for further processing.

In a subsequent step in execution of the proprietary computer-implementable tool introduced hereinbefore being referred in the accompanying FIG. 1, which is further identified in the section titled "Processing for object feature extraction" in FIG. 2, validated data is then subjected to a sub-routine/algorithm that results in extraction of features, including the Width, Circularity, Convex hull, Solidity, Convexity, Circular Equivalent Diameter (CED), Aspect Ratio, Major Axis, Color, and Texture of each object identified as per the preceding disclosures hereof.

Figure 6:
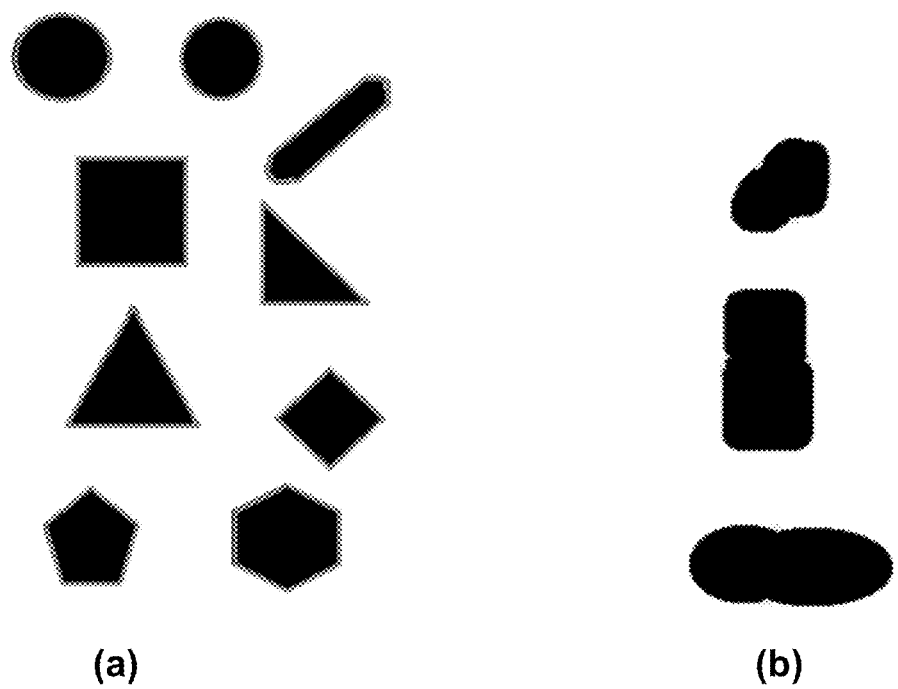
FIG. 6 (a to c) represent objects identified from contour groups being classified as (a) isolated particles or (b) agglomerations identified on basis of user definitions, particularly convexity as shown in (c) as per the present invention substantially disclosed herein.
Figure 6:
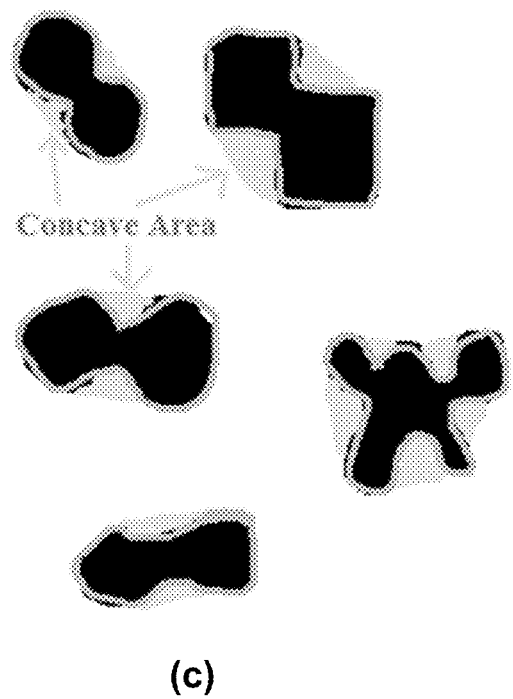

In a subsequent step in execution of the proprietary computer-implementable tool introduced hereinbefore being referred in the section titled "Processing for object feature extraction" in FIG. 2, agglomerates, which need to be removed for accurate discrete particle analysis, are identified and filtered out on basis of their convexity values. In isolated particles, convexity value is high at about 100% whereas in overlapping or connected particles this value small. Accordingly, the isolated/discrete particles are shortlisted for further analysis. The accompanying FIG. 6 (a to c) represents objects identified from contour groups being classified as (a) isolated particles or (b) agglomerations identified on basis of user definitions, particularly convexity as shown in (c). The convexity value of isolated particles is very high compared to the agglomerates which is less than 70%. The particles which have value in between 70% to 99% are the objects to be classified on the user input.

In a subsequent step in execution of the proprietary computer-implementable tool introduced hereinbefore being referred in the section titled "Processing for object feature extraction" in FIG. 2, the resultant filtered object data is classified as per user-defined filters identifying the particles of interest. As will be understood, different objects of interest, such as active pharmacological ingredients, globules and excipients are characterized in unique size, shape, color, texture and type of appearance (for example black than background or white than background). Accordingly, users can identify and set these features using the user interface of the proprietary computer-implementable tool with defined values to thereby assess the components of interest in the sample under processing.

As an example to the preceding paragraph, to differentiate the API and globules, the properties/parameters can be set type of particles—APIs are usually black than the background. While globules form the rings and appear as brighter than background. Globules are circular in shape while APIs are non-circular. The circularity value can be set high for globule i.e. from 80-100 while for API this can be set as 0-80. The size of API is smaller than globule. Hence the API size can be set as 0-5 microns while for globule the size can be set as 4-50 microns.

In a subsequent step in execution of the proprietary computer-implementable tool introduced hereinbefore being referred in the section titled "Processing for object feature extraction" in FIG. 2, the resultant filtered data is subjected to statistical processing as suited to needs of the user. Here, each identified particle is classified into different defined categories. Various statistics can be computed from all the particles from these categories, including minimum particle size, maximum particle size, average particle size, standard deviation, particle count and percentage in different size range (software default range or user defined range), and size distribution values from D1 to D100.

In a concluding step in execution of the proprietary computer-implementable tool introduced hereinbefore being referred in the section titled "Output" in FIG. 2, an analysis report is generated for the sample determined which the user may save or print for his use. Interface of the proprietary computer-implementable tool provisions for choice among user-selectable reports depending on depth and nature of report needed.

Further to the preceding paragraph, a summary report, which is generated for all particle types, is outputted which includes user/company details, Analysis and report time, product (being tested) details, representative image, distribution graph, Analysis Parameters, Results summary, Particle details(min, max, average, standard deviation values, particle count, percentage), size distribution table (D-10, D-50, D-90), Particle size distribution details (particle count and percentage for defined Size ranges) in tabulated format.

Another type of report that can be generated is the distribution report which tabulates the particle size distribution values from D1 to D100. Yet another type of report that can be generated is the particle details report which tabulates details of the particles identified, including particle type (API/Globule or so on), Size, length, width, circularity, solidity, convexity, CED, Aspect ratio, Intensity, Major Axis, Color, and Texture and pictorial representations such as histograms.

Figure 9:
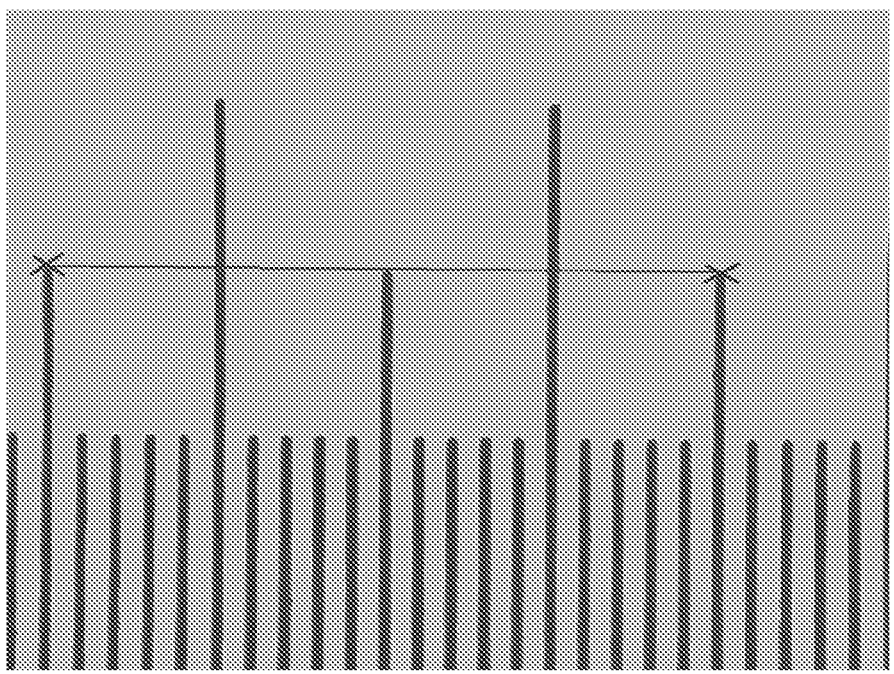
FIG. 9 is a microphotographic image of calibration scale and markings thereon for calibration at 40× magnification in the present invention substantially according to the disclosures hereof.

According to an inventive aspect of the present invention, the proprietary computer-implementable tool/component also provides for system calibration and validation, as a periodic or user-defined calibration run instance before processing the sample in a production run of the process enjoined. Accordingly, before handling an actual sample, calibration of perceived length is done for various lens magnifications including 4×, 10×, 40×, 100× using a standard calibrated μm scale having a least count of 10 μm on glass slide which is certified by government recognized organizations. FIG. 9 is a microphotograph of this calibrated μm scale as seen at 40× magnification. The proprietary computer-implementable tool/component requires the user to plot two points on the scale image and takes input of the distance in μm from user. Next, the pixel size for 40× magnification is calculated as ratio of distance in μm to the pixel distance in the image. This is pixel mapping to the actual distance in μm. Such calibration is done for all the lenses used in the microscope.

Figure 10:
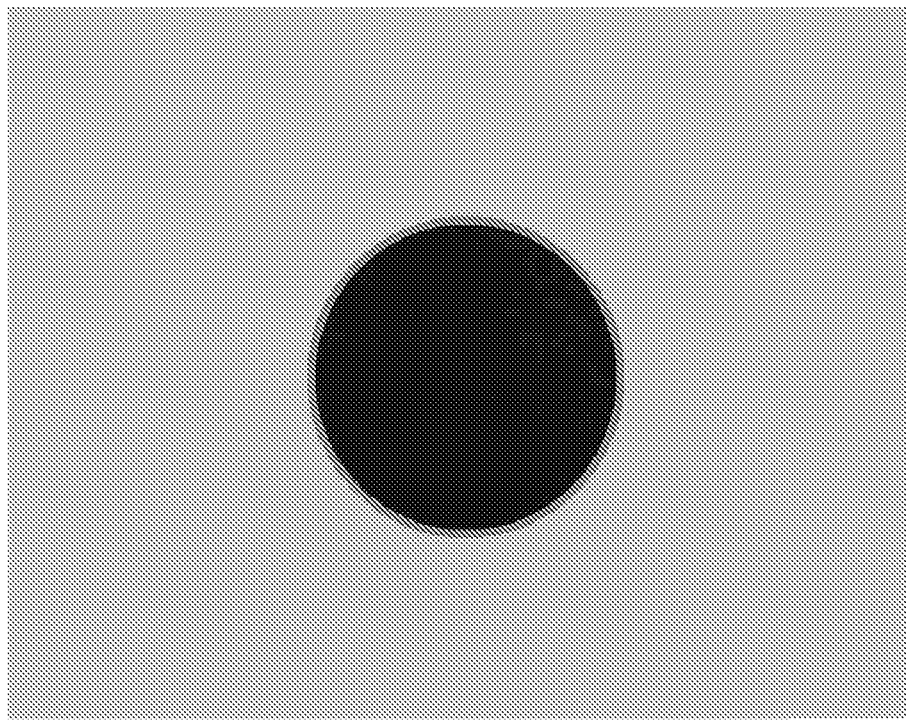
FIG. 10 is a microphotographic image of known circle diameter for validation in the present invention substantially according to the disclosures hereof.

According to another inventive aspect of the present invention, the calibration arrived at by protocol of the preceding paragraph is validated by the proprietary computer-implementable tool/component using microphotographs of standard/reference glass slides having two circles having known diameters 70 μm and 150 μm. The 70 μm circle is used for 10×, 40× and 100× objectives while the 150 μm circle is used for the 4× objective. Said standards are selected from those certified by government recognized organizations. Accordingly, the proprietary computer-implementable tool/component detects the reference standard circles from their microphotographs captured at all magnifications possible with the chosen microscope and computes their diameters. Validation is considered positive if the measured values fall within 2% variation of the known standard values. The proprietary computer-implementable tool/component allows the user to proceed only if validation is positive, else returns a null signal, disallowing further performance of the method proposed herein, in which case the user may start all over. FIG. 10 is a microphotographic image of known circle diameter for validation. FIG. 11 is a sample calibration report format outputted by the proprietary computer-implementable tool/component proposed herein.

According to another inventive aspect of the present invention, the subjectivity of sample preparation and image capturing are overcome by validating image quality and image content. Principally, there are two aspects of validating the images captured by the camera—validation of the image quality and validation of the sample preparation itself. Accordingly, user-defined criteria, being parameters including brightness, contrast and the sharpness are designated for validation of image quality while the minimum number of images required for analysis, minimum number of particles required for analysis and the maximum agglomeration percentage are designated for validation of the image content. The proprietary computer-implementable tool/component provisions for recording a factory provided/user-defined set of reference values for the aforesaid parameters which can be then used to validate the image quality and the image content for the actual sample. This approach ensures the removal of subjectivity and consequently high repeatability.

Figure 7:
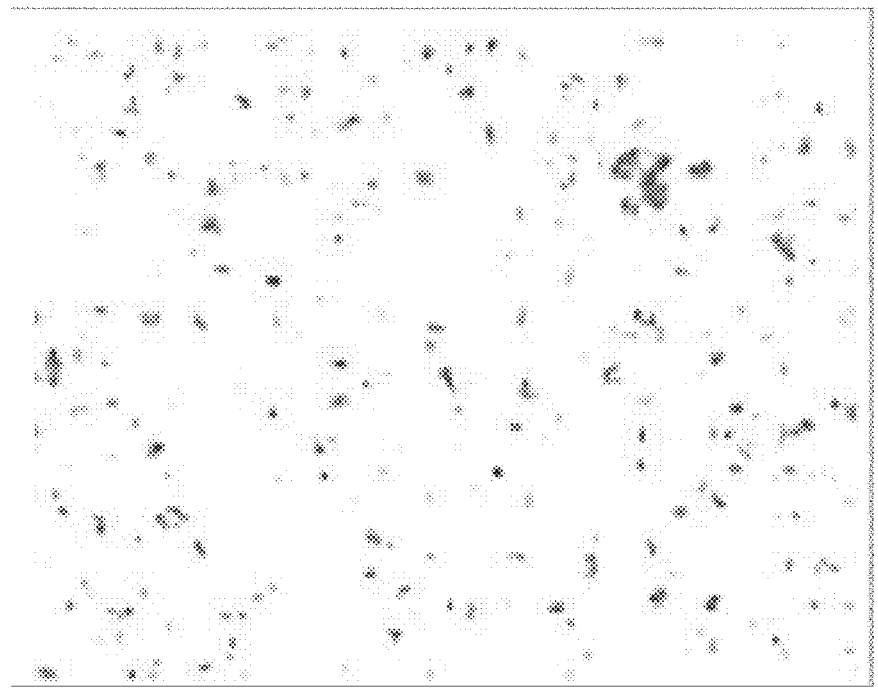
FIGS. 7 (a and b) are microphotographic images of image quality validation as per the present invention substantially according to the disclosures hereof, in which it can be seen that the image quality in image (a) is much higher than image (b).
Figure 7:
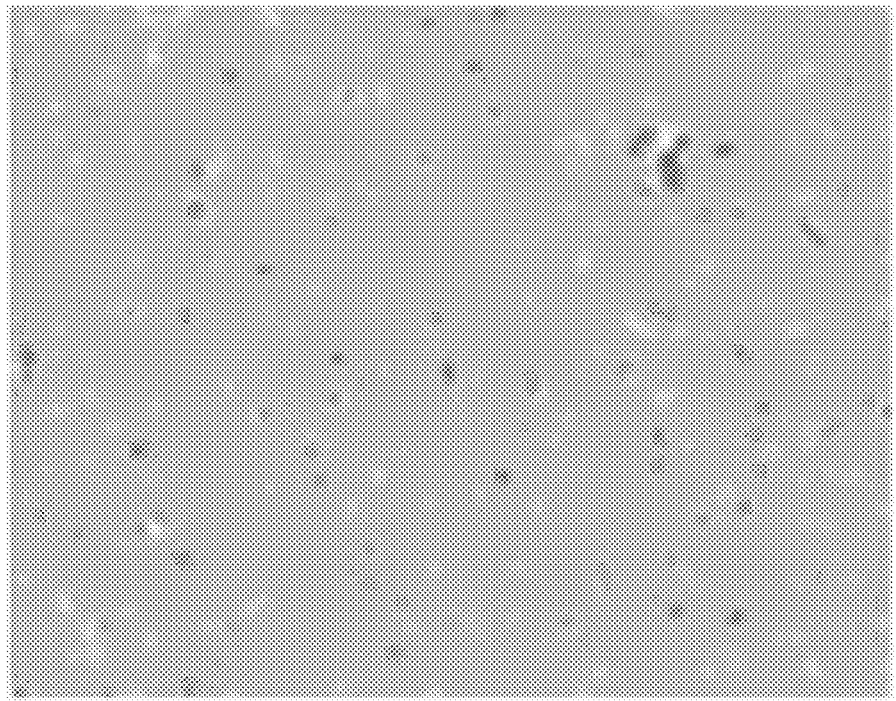
Figure 8:
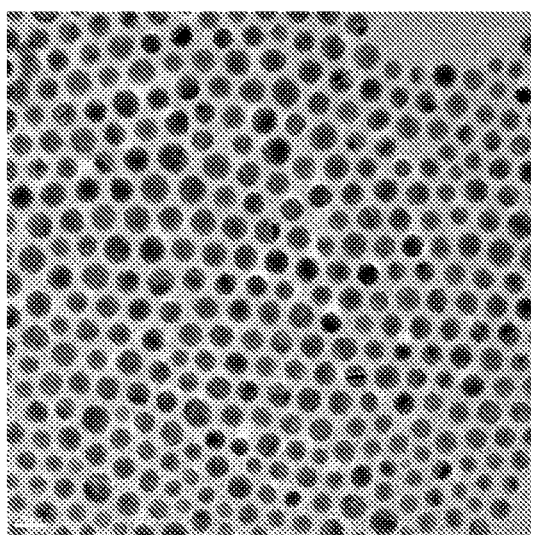
FIGS. 8 (a and b) represent an exemplary use-case showing microphotographic image content, in which image (a) shows the set number of maximum agglomerations, while the image (b) does not satisfy the set control/standard/reference parameters in the present invention substantially according to the disclosures hereof.
Figure 8:
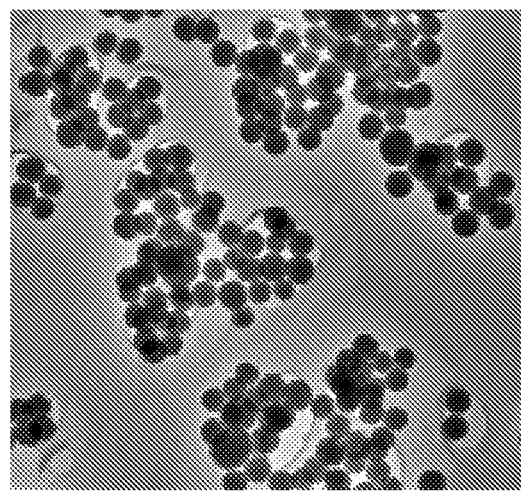
Figure 12:
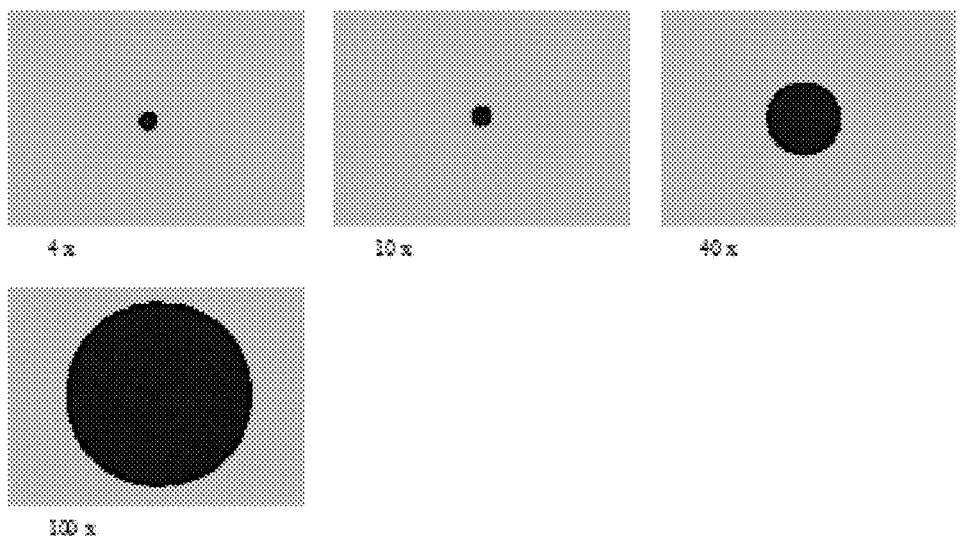
FIG. 12 is a sample validation report generated in the present invention substantially according to the disclosures hereof.

FIGS. 7 (a and b) are microphotographic images of image quality validation in which it can be seen that the image quality in image (a) is much higher than image (b). Furthermore, the accompanying FIGS. 8 (a and b) represent an exemplary use-case showing microphotographic image content, in which image (a) shows the set number of maximum agglomerations, while the image (b) does not satisfy the set control/standard/reference parameters. The proprietary computer-implementable tool/component allows the user to proceed only if validation is positive, else returns a null signal, disallowing further performance of the method proposed herein, in which case the user may start all over by preparing the sample with less agglomerations and recapturing the resultant image. FIG. 12 is a sample validation report generated by the proprietary computer-implementable tool/component proposed herein.

As will be generally realized, applicability and/or performance of the present invention is not designed to be dependent on any particular sample composition and/or preparation techniques. Accordingly, the present invention is able to process microphotographic images of samples including dry powder, liquid, gel, jelly, aerosols, emulsions, suspension, dispersion and so on and in practice, has been observed to provide results in few seconds.

As will be realised further, resolution of the present invention is correlated with optics of the microscope, and not the camera or computing system involved. Camera fitments for optical microscopes are inexpensive and commonly available. Assemblage and operations of these components requires no particular skill or collateral knowledge. Hence, the present invention is free of constraints entailing otherwise from capital, operation and maintenance costs besides negating the requirement of trained skilled operators for implementation of the present invention.

From the foregoing narration, an able technology for identification and classification of particulate matter based on processing of their microphotographic images is thus provided with improved functionality, accuracy and precision than any of its closest peers in state-of-art. The present invention is capable of various other embodiments and that its several components and related details are capable of various alterations, all without departing from the basic concept of the present invention.

A latitude of modifications, substitutions and changes is intended in the foregoing disclosure, and in some instances some features of the invention will be employed without a corresponding use of other features. Accordingly, it is appropriate that the appended claims be construed broadly and in a manner consistent with the spirit and scope of the invention substantially proposed herein.

We claim:

1. A method for detection and classification of particles in a sample based on processing of microphotographic imagery of the sample captured via an optical microscope, comprising:
   a) selecting at least one microphotograph of the sample which satisfies user-defined criteria for image quality and image content, therein otherwise directing the user to repeat selection till at least one satisfactory microphotograph is obtained;
   b) subjecting the at least one microphotograph selected to a subroutine for identification of particles present in the sample;
   c) subjecting the data reached in step b) to a subroutine for extraction of object feature data therein;
   d) subjecting the data extracted in step c) to analytics, including classification and statistical processing, on basis of user-defined feature-based attributes of interest; and
   e) Outputting the outcome of step d) in a report format, including particle type, size, length, width, circularity, solidity, convexity, circular equivalent diameter, aspect ratio, intensity, major axis, color, and texture and pictorial representations such as histograms to thereby apprise the user as to the detection and classification of particles in the sample.

2. The method for detection and classification of particles in a sample based on processing of microphotographic imagery of the sample as claimed in claim 1, wherein the subroutine for identification of particles present in the sample comprises:
   a) conditioning the at least one microphotograph selected, to thereby remove noise in particular, by applying a Gaussian smooth algorithm;
   b) further conditioning the microphotograph of step a) by discarding all color data therein to thereby result in a conditioned grayscale microphotograph;
   c) measuring the gray level intensities of individual pixels comprising the conditioned grayscale microphotograph on a scale of 0 to 255 points with unit increments of 10 points and joining, among them, the pixels having equal gray level intensity to thereby demarcate contours reflective of particles distributed in the sample;
   d) grouping the contours identified in step c) based upon closeness of said contours and the shared area between them to thereby establish contour clusters representative of discrete particles in the sample;
   e) identifying circumscribing boundaries of particles from among the contour clusters established in step d), to thereby identify discrete particles in the sample; and
   f) validating particles of interest to the user among the data identified in step f), therein filtering out false particles in parallel, on basis of user-defined size and sharpness corresponding to particles of interest to the user in the sample.

3. The method for detection and classification of particles in a sample based on processing of microphotographic imagery of the sample as claimed in claim 2, wherein the false particles are alternatively among those other than particles of interest to the user, those owing their apparent detection due to artifacts in the sample, those owing their apparent detection due to more than one optical layer being selected while focusing the conditioned grayscale microphotograph.

4. The method for detection and classification of particles in a sample based on processing of microphotographic imagery of the sample as claimed in claim 2, wherein the choice of identifying the circumscribing boundary of a particle in step e) is open to discretion of the user, to be selected among:
   a) the contour with highest sharpness;
   b) the outermost contour; or
   c) the contour with highest circularity, in case the particles identified have circular geometry.

5. The method for detection and classification of particles in a sample based on processing of microphotographic imagery of the sample as claimed in claim 1, wherein the subroutine for extraction of object feature data comprises:
   a) extracting features, including width, circularity, convex hull, solidity, convexity, circular equivalent diameter, aspect ratio, major axis, color, and texture of the particles identified;
   b) validating discreet particles in the sample, therein filtering out agglomerated, overlapping or connected particles, on basis of convexity value determined in step a);

c) classifying the feature data corresponding to the discreet particles validated in step b) to result in raw data as to the detection and classification of particles in the sample; and d) subjecting the raw data reached at step c) to statistical processing to thereby result in final data as to the detection and classification of particles in the sample.

6. The method for detection and classification of particles in a sample based on processing of microphotographic imagery of the sample as claimed in claim 5, wherein the agglomerated, overlapping or connected particles are identified as those having a convexity value less than 70%.

7. The method for detection and classification of particles in a sample based on processing of microphotographic imagery of the sample as claimed in claim 1, wherein the sample is prepared in as a thin film, or a smear, irrespectively of the sample being present in either solid, liquid or semi-solid states.

8. The method for detection and classification of particles in a sample based on processing of microphotographic imagery of the sample as claimed in claim 1, which is made non-subjective, and therefore accurate and precise, as to the manner of image content, and therefore sample preparation, by mandating conformity to user-defined parameters including the minimum number of microphotographic images, minimum number of particles and the maximum agglomeration percentage required for analysis.

9. The method for detection and classification of particles in a sample based on processing of microphotographic imagery of the sample as claimed in claim 1, which is made non-subjective, and therefore accurate and precise, as to the quality of microphotographic image selected by mandating conformity to user-defined parameters thereof, including brightness, contrast and sharpness required for analysis.

10. The method for detection and classification of particles in a sample based on processing of microphotographic imagery of the sample as claimed in claim 1, which is made non-subjective, and therefore accurate and precise, as to the measurement of feature data, by including a calibrating set of microphotographs corresponding to standardized scale, a micrometer scale having a least count of 10 µm in particular, and circle templates, of diameters 70 µm and 150 µm in particular, arranged for the particular magnification ratio of the microphotographic imagery selected by the user.

11. The method for detection and classification of particles in a sample based on processing of microphotographic imagery of the sample as claimed in claim 10, wherein the pixel size for a particular magnification ratio of the microphotograph selected are arrived at by a user by plotting two points on the calibrated scale image, receiving definition from the user as to the distance between said two points, and thereafter calculating the ratio of distance in micrometers to the pixel distance in said image.

12. A system for implementing the method of claim 1, comprising:

a) means of imaging, including a trinocular optical microscope fitted with a digital camera in particular, for allowing a user to visualize and therein capture microphotographic imagery of the sample;

b) means of computation, a personal computer in particular, arranged to receive a live video feed from the means of imaging, via transmission means selected alternatively among a universal serial bus cable, Bluetooth, WiFi and their equivalents in particular, and thereby allow the user to select therein at least one microphotographic image of interest;

c) a proprietary computer-implementable tool/component pre-installed on the computational means, being non-transitory computer or machine readable program elements in particular which, upon execution, are translatable for presenting to the user one or more appropriate user interfaces using which the user may define the criteria for image quality, image content and feature-based attributes corresponding to the particles of interest; and d) a calibrating set of microphotographs corresponding to standardized scale, a micrometer scale having a least count of 10 µm in particular, and circle templates, of diameters 70 µm and 150 µm in particular, arranged for the magnification ratio of the microphotographic imagery selected by the user.

13. The method for detection and classification of particles in a sample based on processing of microphotographic imagery of the sample as claimed in claim 1, wherein the subroutine for identification of particles present in the sample comprises:

a) conditioning the at least one microphotograph selected, to thereby remove noise in particular, by applying a Gaussian smooth algorithm;

b) further conditioning the microphotograph of step a) by discarding all color data therein to thereby result in a conditioned grayscale microphotograph;

c) measuring the gray level intensities of individual pixels comprising the conditioned grayscale microphotograph on a scale of 0 to 255 points with unit increments of 10 points and joining, among them, the pixels having equal gray level intensity to thereby demarcate contours reflective of agglomerates distributed in the sample;

d) grouping the contours identified in step c) based upon closeness of said contours and the shared area between them to thereby establish contour clusters representative of discrete agglomerates in the sample;

e) identifying circumscribing boundaries of particles from among the contour clusters established in step d), to thereby identify discrete agglomerates in the sample; and f) validating particles of interest to the user among the data identified in step e), therein filtering out false particles in parallel, on basis of user-defined size and sharpness corresponding to particles of interest to the user in the sample.

14. The method for detection and classification of particles in a sample based on processing of microphotographic imagery of the sample as claimed in claim 1, which is made non-subjective, and therefore accurate and precise, as to the manner of image content, and therefore sample preparation, by mandating conformity to user-defined parameters including the minimum number of microphotographic images, minimum number of particles and the maximum agglomeration percentage permitted for analysis.

15. The method for detection and classification of particles in a sample based on processing of microphotographic imagery of the sample as claimed in claim 1, which is made non-subjective, and therefore accurate and precise, as to the quality of microphotographic image selected by mandating conformity to user-defined parameters thereof, including brightness, contrast and sharpness permitted for analysis.

* * * * *